Aug. 19, 1930.   B. TURNER   1,773,653
ARC WELDING ELECTRODE
Filed June 19, 1928
*Fig. 1.*
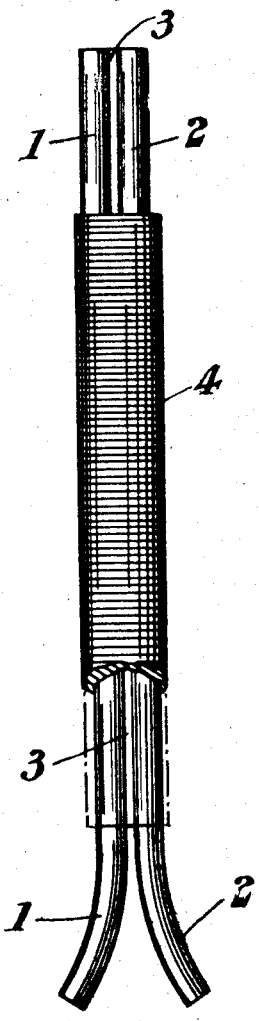
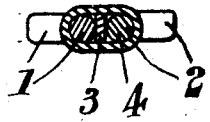
*Fig. 2.*
INVENTOR
BERTRAND TURNER
BY HIS ATTORNEYS
Howson and Howson Patented Aug. 19, 1930

1,773,653

UNITED STATES PATENT OFFICE

BERTRAND TURNER, OF WOLVERHAMPTON, ENGLAND, ASSIGNOR TO THE FERRO-ARC WELDING COMPANY LIMITED, OF LONDON, ENGLAND

ARC-WELDING ELECTRODE

Application filed June 19, 1928, Serial No. 286,634, and in Great Britain August 26, 1927.

This invention relates to the manufacture of electrodes, welding rods and the like used for welding and depositing metal by the electric arc process and particularly to the production of electrodes or the like for welding with all the three phases of a three phase alternating current supply circuit.

Hitherto metallic arc welding has been usually carried out with either a direct current or a single phase alternating current, one pole or one phase as the case may be, being connected to the work and the other to a suitable holder in which the electrode is held. On touching the electrode to the work and then withdrawing slightly an arc is formed which enables welding to proceed in the well-known manner. An arc suitable for welding may also be obtained across two phases of a polyphase or three phase alternating current supply, but such a condition throws the loading of the circuit out of balance and is open to serious objections. It has already been proposed to use all the three phases by connecting one phase to the work, and the other two phases to a twin electrode, which when applied to the work will make a star point connection. The construction of such a twin electrode is a matter of considerable difficulty, as it is necessary to have the wires covered with a suitable coating which must be uniformly applied along the length of the wires and moreover the wires must be effectively electrically insulated from each other through the whole of their length otherwise short circuits will occur. Further it is found that the heat of the arc is concentrated between the two electrodes and when the coating or insulating material between them is of the same composition as the material on the outside, this causes the portion between the electrodes to melt in advance of and at a faster rate than that on the outside which adversely affects the working of the process.

According to this invention this difficulty is overcome by making that portion of the coating which is between the wires of a material having a higher melting point than the rest of the coating. In this way it is possible to arrange that all portions of the coating melt away at substantially the same desired rate which is usually the rate at which the wires are consumed. This may be effected as illustrated in the accompanying drawing (wherein Figure 1 shews in elevation, with parts broken away, and Figure 2 in transverse section, an electrode embodying this invention) by providing between the wires 1 and 2 a strip of insulating material 3 preferably of the same width as the diameter of the said wires the whole being bound together by an outside winding or suitable form of coating 4. The strip 3 is made of any suitable material having a relatively high melting point such as white asbestos which may be treated with fluxes such as lime, china clay, silicate of soda or sodium carbonate and which may be combined with each other or not, while the outside winding may be made of blue asbestos yarn. It will be understood that this invention is not limited to any particular kinds of coating since it includes the use of any two materials having different melting points which are otherwise suitable for use as coatings.

What I claim is:—

1. An electrode for arc welding and like uses comprising parallel wire rods encased in an insulating casing and separated by a strip of insulating material, said strip having a melting point higher than said casing, the melting points of both strip and casing being so regulated that the casing and strip are consumed at the same rate at which the rod is consumed during the welding or like process.

2. An electrode for arc welding and like uses, comprising parallel wire rods encased in an insulating casing of blue asbestos and separated by a strip of white asbestos, said strip having a melting point higher than said casing, the melting points of both strip and casing being so regulated that the casing and strip are consumed at the same rate at which the rod is consumed during the welding or like process.

3. An electrode for arc welding and like uses, comprising parallel wire rods encased in an insulating casing and separated by a strip of insulating material, said strip having a melting point higher than said casing, the melting points of both strip and casing being so regulated that the casing and strip are consumed at the same rate at which the rod is consumed during the welding or like process, said insulating materials being treated with a sodium carbonate flux.

4. An electrode for arc welding and like uses, comprising parallel wire rods encased in an insulating casing and separated by a strip of insulating material, said strip having a melting point higher than said casing, the melting points of both strip and casing being so regulated that the casing and strip are consumed at the same rate at which the rod is consumed during the welding or like process, said insulating materials being treated with a lime flux.

In testimony whereof I have signed my name to this specification.

BERTRAND TURNER.